July 14, 1970   E. M. EMERY ET AL   3,520,108

METHOD AND APPARATUS FOR CHLORINATED BIPHENYL ANALYSIS

Filed Nov. 27, 1968   2 Sheets-Sheet 1

INVENTORS
EDWARD M. EMERY
GERALD M. GASSER
BY
J. E. Maurer
ATTORNEY

United States Patent Office 3,520,108
Patented July 14, 1970

3,520,108
METHOD AND APPARATUS FOR CHLORINATED BIPHENYL ANALYSIS
Edward M. Emery, Brentwood, and Gerald M. Gasser, St. Louis, Mo., assignors to Monsanto Company, St. Louis, Mo., a corporation of Delaware
Continuation-in-part of application Ser. No. 616,278, Feb. 15, 1967. This application Nov. 27, 1968, Ser. No. 779,608
Int. Cl. B01d 15/08
U.S. Cl. 55—67         12 Claims

ABSTRACT OF THE DISCLOSURE

Method for analysis of mixtures containing chlorinated biphenyl isomers by gas-liquid chromatography using certain polyphenyl ethers as absorbents.

---

This application is a continuation-in-part of copending application Ser. No. 616,278, filed Feb. 15, 1967, now abandoned.

This invention relates to a method for the analysis of mixtures containing various chlorinated biphenyl isomers and homologs by gas-liquid chromatography and in particular relates to such an analysis employing therein an improved liquid-phase absorbent composed of certain polyphenyl thioethers and/or mixed polyphenyl ethers-thioethers.

The analysis of mixtures of chlorinated biphenyl compounds including biphenyl, monochloro-, dichloro- and trichlorobiphenyls as well as such mixtures which also contain biphenyl is a very difficult problem because of the similar physical properties of such compounds. With the advent of gas-liquid chromatography, some advance was made in analysis of such mixtures; however, no completely satisfactory analysis has heretofore been readily accomplished with gas-liquid chromatography because of the lack of a suitable column coating or packing. With the prior art coatings the peaks obtained have been poorly shaped and in many instances the peaks for each separate isomer have not been realized. Thus, even when using one of the coatings which has heretofore been found to be reasonably effective for analysis of such mixture, e.g., silicone gum rubber, complete resolution cannot be obtained, for example, between 4,4'- and 3,4'-dichlorobiphenyl.

It is, therefore, an object of this invention to provide an improved coating or packing for gas-liquid chromatographic columns which provides properly shaped peaks and good resolution in analyzing mixtures containing various chlorinated biphenyl compounds and such mixtures which also contain biphenyl. Another object of this invention is to provide an absorbent for gas-liquid chromatographic columns which is sufficiently high boiling so as not to be eluted from the columns under the conditions necessary for the analysis of the mixtures referred to. These and other objects will be apparent from the following description of the invention.

It has now been found that mixtures of chlorinated biphenyl compounds can be readily and effectively analyzed by gas-liquid chromatography by employing as the liquid phase of a gas-liquid chromatographic column a polyphenyl thioether represented by the structure (I) 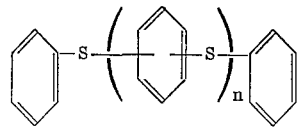

where $n$ is a whole number from 3 to 7, or a mixed polyphenyl etherthioether represented by the structure (II) 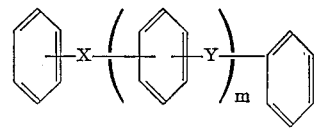

where $m$ is a whole number from 3 to 7 and X and Y are each O or S; provided, however, that the number of the S's in the sum of $X+Y$ is at least one-third of such sum and preferably at least one-half of such sum, or the structure

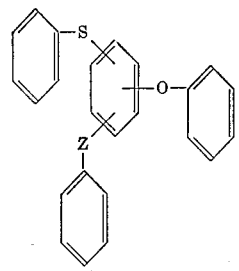

where Z is O or S.

Also included within the scope of this invention are phenylmercaptobiphenyl compounds which can be represented by the structure (IV) 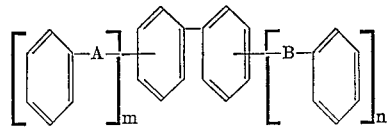

where A and B are each independently O or S provided that the number of S atoms in the sum of $A+B$ is at least one-third and preferably one-half of such sum and $m$ and $n$ are whole numbers from 0 to 3 and the sum of $m+n$ is from 2 to 6.

In addition to the foregoing compounds, the phenyl and phenylene groups of such compounds can contain substituents, such as alkyl of 1 to 4 carbon atoms, alkoxy of 1 to 4 carbon atoms, halogen, phenyl and perfluoroalkyl of 1 to 4 carbon atoms. Typical examples of such compounds are those of U.S. Pats. Nos. 3,098,104; 3,098,105; 3,100,801; 3,114,777 and 3,124,619.

Mixtures of the compounds described above can also be used. For convenience, the polyphenyl thioethers, mixed polyphenyl ethers-thioethers and biphenyl compounds and their substituted derivatives are referred to herein merely as "'polyphenyl thioethers."

The polyphenyl thioethers are viscous, in some cases almost solid, materials at room temperature but by raising their temperatures they become sufficiently liquid to enable their use in connection with the present invention, that is, they can be made sufficiently liquid to enable their use as the liquid phase of a gas-liquid chromatographic column. Thus, the term "liquid phase" as used herein refers to the absorbent of the chromatographic column whether an ingredient of the packing, on the support or in a separate liquid layer and regardless of whether it be liquid or solid at the temperature at which the gas-liquid chromatographic analysis is performed.

Obviously, in addition to gas-liquid chromatographic packed columns, polyphenyl thioethers of this invention can also be used in capillary columns in which the internal surfaces of the column are coated with the partitioning liquid.

Typical examples of the polyphenyl thioethers of this invention are o-Bis(o-phenylmercaptophenyl) sulfide
m-Bis(m-phenylmercaptophenyl) sulfide
p-Bis(p-phenylmercaptophenyl) sulfide
m-Bis(o-phenylmercaptophenyl) sulfide
m-Bis(p-phenylmercaptophenyl) sulfide
1,2,3-tris(phenylmercapto)benzene
1,2,4-tris(phenylmercapto)benzene
1,3,5-tris(phenylmercapto)benzene
o-Bis(o-phenylmercaptophenylmercapto)benzene
m-Bis(m-phenylmercaptophenylmercapto)benzene
p-Bis(p-phenylmercaptophenylmercapto)benzene
p-Bis(o-phenylmercaptophenylmercapto)benzene
p-Bis(m-phenylmercaptophenylmercapto)benzene
m-Bis(p-phenylmercaptophenylmercapto)benzene
o-Bis(p-phenylmercaptophenylmercapto)benzene
ar-Bis(phenylmercapto)-ar'-(phenylmercapto)benzene
Bis[m-(m-phenylmercaptophenylmercapto)phenyl] sulfide
Bis[p-(p-phenylmercaptophenylmercapto)phenyl] sulfide
Bis[p-(m-phenylmercaptophenylmercapto)phenyl] sulfide
p-Bis[p-(p-(p-methylphenylmercapto)phenylmercapto)phenyl] sulfide
Bis[p-(p-alpha-cumylphenylmercapto)phenyl] sulfide
Bis[p-(p-bromophenylmercapto)phenylmercapto)phenyl] sulfide
m-Bis[m-(m-phenylmercaptophenylmercapto)phenylmercapto]benzene
m-Bis[m-(p-phenylmercaptophenylmercapto)phenylmercapto]benzene
Bis[p-(p-(p-phenylmercaptophenylmercapto)phenylmercapto)phenyl] sulfide
Bis[m-(m-(m-phenylmercaptophenylmercapto)phenylmercapto)phenyl] sulfide
m-Phenoxydiphenyl sulfide
p-Phenoxydiphenyl sulfide
o-Phenoxydiphenyl sulfide
Bis(p-phenylmercaptophenyl) ether
Bis(m-phenylmercaptophenyl) ether
m-Phenylmercaptophenyl p-phenylmercaptophenyl ether
m-Phenylmercaptophenyl m-phenoxyphenyl sulfide
m-Bis(m-phenoxyphenoxy)benzene
3-(m-phenylmercaptophenylmercapto)-3'-phenoxydiphenyl ether
m-Bis(m-phenoxyphenylmercapto)benzene
3-phenylmercapto-3'-(m-phenylmercaptophenylmercapto)diphenyl ether
3-phenylmercapto-3'-(p-phenoxyphenoxy)diphenyl sulfide
Bis[m-(m-phenylmercaptophenoxy)phenyl] sulfide
o-Phenylmercapto-p'-phenoxydiphenyl sulfide
o-Phenylmercapto-m'-phenoxydiphenyl sulfide
o-Phenoxy-m'-phenylmercaptodiphenyl sulfide
m-Phenoxy-p'-phenylmercaptodiphenyl sulfide
o-Phenoxy-p'-phenylmercaptodiphenyl sulfide
p-Phenoxy-p'-phenylmercaptodiphenyl sulfide
o-Phenoxy-o'-phenylmercaptodiphenyl sulfide
o-o-'-Bis(phenylmercapto)diphenyl ether
o-Phenylmercapto-m-phenylmercaptodiphenyl ether
o-Phenylmercapto-p-phenylmercaptodiphenyl ether
m-(m-Phenylmercaptophenylmercapto)(m-phenoxyphenylmercapto)benzene
[m-(m-Phenylmercaptophenylmercapto)phenyl][m-(m-phenoxyphenylmercapto)phenyl] sulfide
3-(m-phenylmercaptophenylmercapto)-3'-(m-phenylmercaptophenoxy)diphenyl sulfide
3,3'-bis(m-phenylmercaptophenylmercapto)diphenyl ether
3-(m-phenylmercaptophenylmercapto)-3'-(m-phenoxyphenoxy)diphenyl sulfide
4-(m-phenylmercaptophenylmercapto)-4'-(m-phenylmercaptophenoxy)diphenyl ether
3-(m-phenylmercaptophenylmercapto)-3'-(m-phenoxyphenylmercapto)diphenyl ether
4,4'-bis(m-phenylmercaptophenoxy)diphenyl sulfide
4,4'-bis(m-phenoxyphenylmercapto)diphenyl sulfide
3-(m-phenoxyphenylmercapto)-3'-(m-phenylmercaptophenoxy)diphenyl sulfide
3,3'-bis(m-phenylmercaptophenoxy)diphenyl ether
4-(m-phenylmercaptophenylmercapto)-4'-(m-phenoxyphenoxy)diphenyl ether
3-(p-phenylmercaptophenoxy)-3'-(p-phenoxyphenoxy)diphenyl sulfide
3-(m-phenylmercaptophenoxy)-3'-(m-phenoxyphenylmercapto)diphenyl ether
3,3'-bis(m-phenoxyphenylmercapto)diphenyl ether
3-(m-phenoxyphenylmercapto)-3'-(m-phenoxyphenoxy)diphenyl sulfide
1-phenoxy-3,5-bis(phenylmercapto)benzene
1-phenylmercapto-3,5-bis(phenoxy)benzene
1-phenoxy-2,5-bis(phenylmercapto)benzene
2,2'-bis(phenylmercapto)biphenyl
3,3'-bis(phenylmercapto)biphenyl
4,4'-bis(phenylmercapto)biphenyl
3-phenylmercapto-3'-phenoxybiphenyl
2-(m-phenoxy-m-phenylmercapto)biphenyl
2,2'-4-tris(phenylmercapto)biphenyl
2,4-bis(phenylmercapto)-2'-phenoxybiphenyl
2,2'-4,4'-tetra(phenylmercapto)biphenyl
2,2',3,3',4,4'-hexa(phenylmercapto)biphenyl A further understanding of the present invention will be readily apparent to those skilled in the art from consideration of FIGS. 1 and 2.

Figure 1:
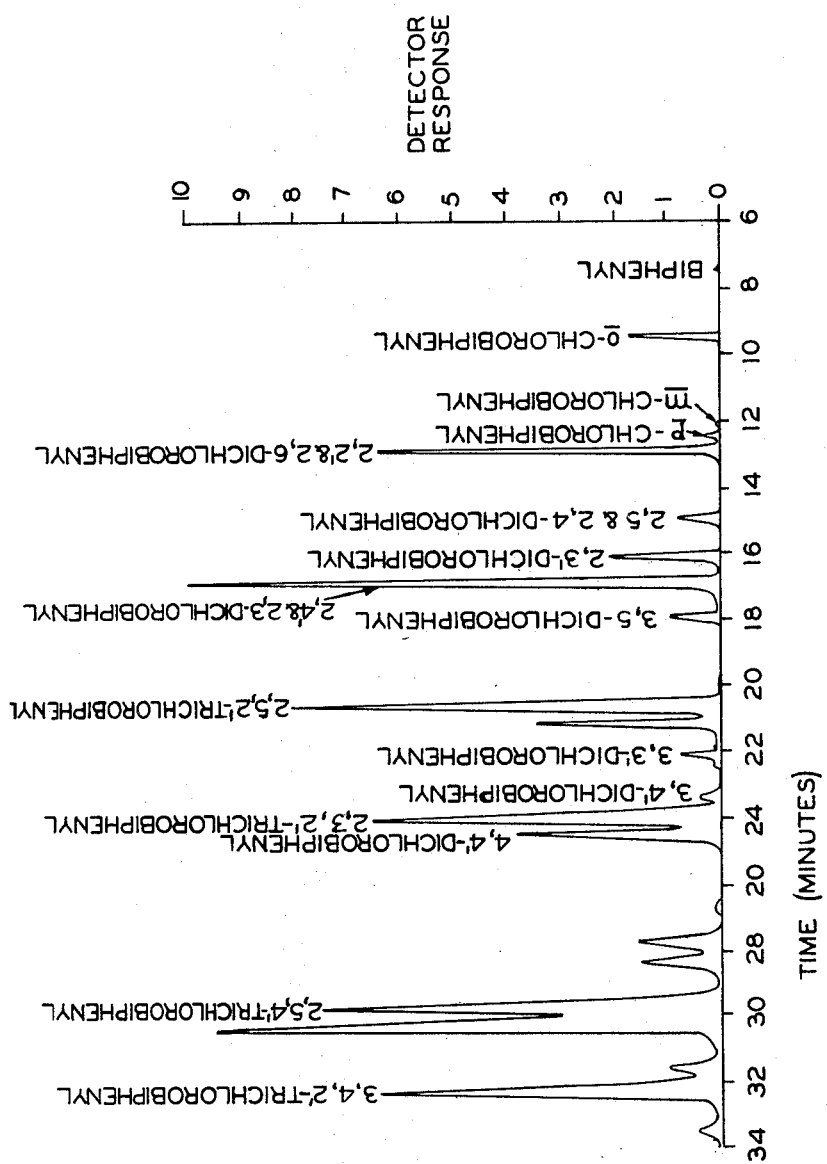
FIG. 1 is a chromatogram resulting from the analysis of a mixture of chlorinated biphenyl compounds, obtained by the chlorination of biphenyl to an average chlorine content of 42% by weight, using a polyphenyl thioether of this invention.
Figure 2:
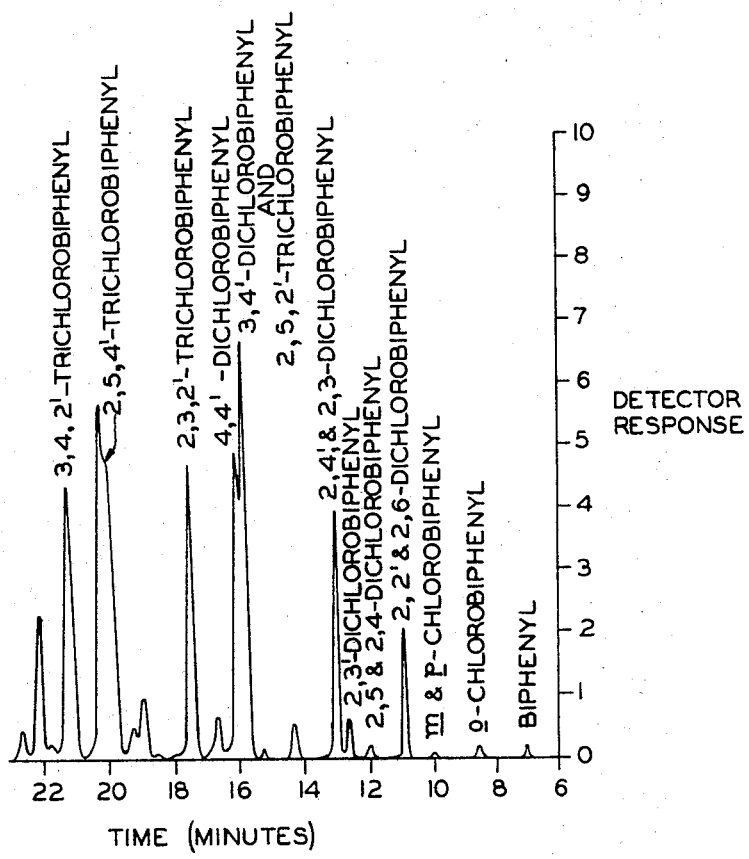
FIG. 2 is a chromatogram resulting from the analysis of the same mixture of chlorinated biphenyl compounds used to provide FIG. 1 but using as the absorbent a silicone gum rubber (a prior art material).

In addition to FIGS. 1 and 2 the following examples further illustrate the instant invention.

EXAMPLE 1

A 200 foot length of stainless steel tubing having an inside diameter of 0.01 inch was washed by forcing 20 ml. of methylene chloride through it under 75 p.s.i.g. gas pressure followed in similar maner by 20 ml. of acetone. The column was dried by purging with nitrogen for 15 minutes. A coating solution was prepared by dissolving 1 gram of 3,3'-bis(m-phenylmercaptophenoxy)diphneyl sulfide in 9 grams of methylene chloride. This solution was forced through the capillary tubing under 30 p.s.i.g. nitrogen pressure. The column was then purged with nitrogen at 15 p.s.i.g. for 1 hour to evaporate the solvent. The resulting column was used to analyze a mixture of chlorinated biphenyl compounds by gas-liquid chromatography using a 1 microliter sample with an inlet splitter flow of 250 ml. per minute and a column flow of 2.8 ml. per minute of nitrogen. The column temperature was 230° C. and a flame ionization detector was used. The chromatogram was complete in 50 minutes and showed well-shaped peaks with complete separation of 4,4'- and 3,4'-dichlorobiphenyl and resolution of 2,5,2'- and 2,5,4'-trichlorobiphenyl from other components (FIG. 1).

EXAMPLE 2

A mixture of chlorinated biphenyl compounds having the same composition as the mixture analyzed in Example 1 was chromatographed as in Example 1 using a 200 foot length of stainless steel tubing having an inside diameter of 0.02 inch coated in identical fashion with a solution of 0.4 gram of silicone gum rubber in 19.6 grams of n-hexane. The conditions used were 230° C. and a pressure of 6 p.s.i.g. The resulting chromatogram did not separate 4,4'- and 3,4'-dichlorobiphenyl and did not resolve 2,5,2'- and 2,5,4'-trichlorobiphenyl from other components (FIG. 2).

EXAMPLES 3–5

Following the procedure of Example 1 three chromatographic columns were prepared. One column, 3,3'-bis(m-phenylmercaptophenylmercapto)diphenyl sulfide, was used as the coating; in another column m-bis(m-phenoxyphenylmercapto)benzene was used as the coating; while in the third column 3,3'-bis(phenylmercapto)biphenyl was used as the coating.

Using each of these columns a chromatogram was prepared of a chlorinated biphenyl mixture which was the same as the mixture used in Examples 1 and 2. In each case the resulting chromatogram showed a selectivity essentially the same as that shown by the polyphenyl thioether used in Example 1.

In addition to the mixture of chlorinated biphenyl compounds employed above for purposes of illustration, the present invention is also applicable to the analysis of mixtures of chlorinated biphenyl compounds containing less than or more than an average chlorine content of 42% by weight. For example, chlorinated biphenyl is commercially available as products containing about 21%, 32%, 48%, 54% and 60% by weight of combined chlorine corresponding approximately to mono-, di-, tetra-, penta- and hexachlorobiphenyl, respectively.

The embodiments of this invention in which an exclusive property or privilege is claimed are defined as follows:

1. In a method of separating components of a chlorinated biphenyl-containing mixture by gas-liquid chromatography, the improvement comprising utilizing as the liquid phase an unsubstituted polyphenyl thioether.

2. In a method of claim 1 where the polyphenyl thioether is represented by the structure

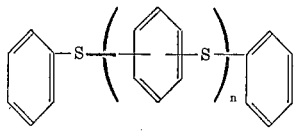

where $n$ is a whole number from 3 to 7.

3. In the method of claim 2 where the polyphenyl thioether is an all meta-linked polyphenyl thioether.

4. In a method of claim 1 where the polyphenyl thioether is represented by the structure

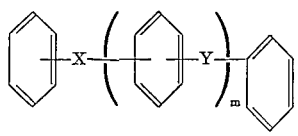

where $m$ is a whole number from 3 to 7 and X and Y are each O or S; provided, however, that the sum of X plus Y includes at least one O and that the number of the S's in the sum of $X+Y$ is at least one-third of such sum and preferably at least one-half of such sum.

5. In the method of claim 4 where the polyphenyl thioether is an all-meta-linked polyphenyl thioether.

6. In a method of claim 1 where the polyphenyl thioether is represented by the structure

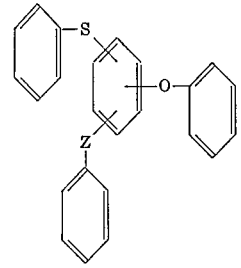

where Z is O or S.

7. In a method of claim 1 where the polyphenyl thioether is represented by the structure

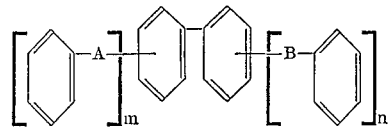

where A and B are each independently O or S provided that the number of S atoms in the sum of $A+B$ is at least one-third and preferably one-half of such sum and $m$ and $n$ are whole numbers from 0 to 3 and the sum of $m+n$ is from 2 to 6.

8. In a method of claim 5 where the number of sulfur linkages in the sum of $x+y$ is at least one-half of such sum.

9. In a method of claim 5 where the polyphenyl thioether is 3,3'-bis(m - phenylmercaptophenoxy)diphenyl sulfide.

10. In a gas-liquid chromatographic column, the improvement which comprises a liquid phase comprising an unsubstituted polyphenyl thioether.

11. In a column of claim 10 where the polyphenyl thioether is represented by the structure

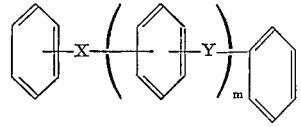

where $m$ is a whole number from 3 to 7 and X and Y are each O or S; provided, however that the sum of X plus Y includes at least one O and that the number of the S's in the sum of $X+Y$ is at least one-third of such sum and preferably at least one-half of such sum.

12. In a column of claim 11 where the polyphenyl thioether is 3,3'-bis(m-phenylmercaptophenoxy)diphenyl sulfide.

References Cited

UNITED STATES PATENTS 3,311,665  3/1967  Campbell et al. _____ 260—609

OTHER REFERENCES

West, W. W., "The Analysis of Polyphenyl Radiolysis Products by Gas Chromatography and Other Methods," Gas Chromatography Abstracts 1964, pp. 38–39.

Weingarten, H., "Electronic Effects in the Gomberg Reaction," J. Org. Chem., 25, 1066–67 (1960).

Weingarten, H., "Steric Effects in the Gomberg Reaction," J. Org. Chem., 26, 730–33 (1961).

Weingarten, H., "Aluminum Chloride-Induced Isomerization of Chlorinated Biphenyls," J. Org. Chem., 27, 2024–26 (1962).

JAMES L. DeCESARE, Primary Examiner

U.S. Cl. X.R.

260—609